Feb. 26, 1946.   C. B. WILSON ET AL   2,395,439
FLUID PRESSURE DELIVERY MECHANISM
Filed Jan. 29, 1943
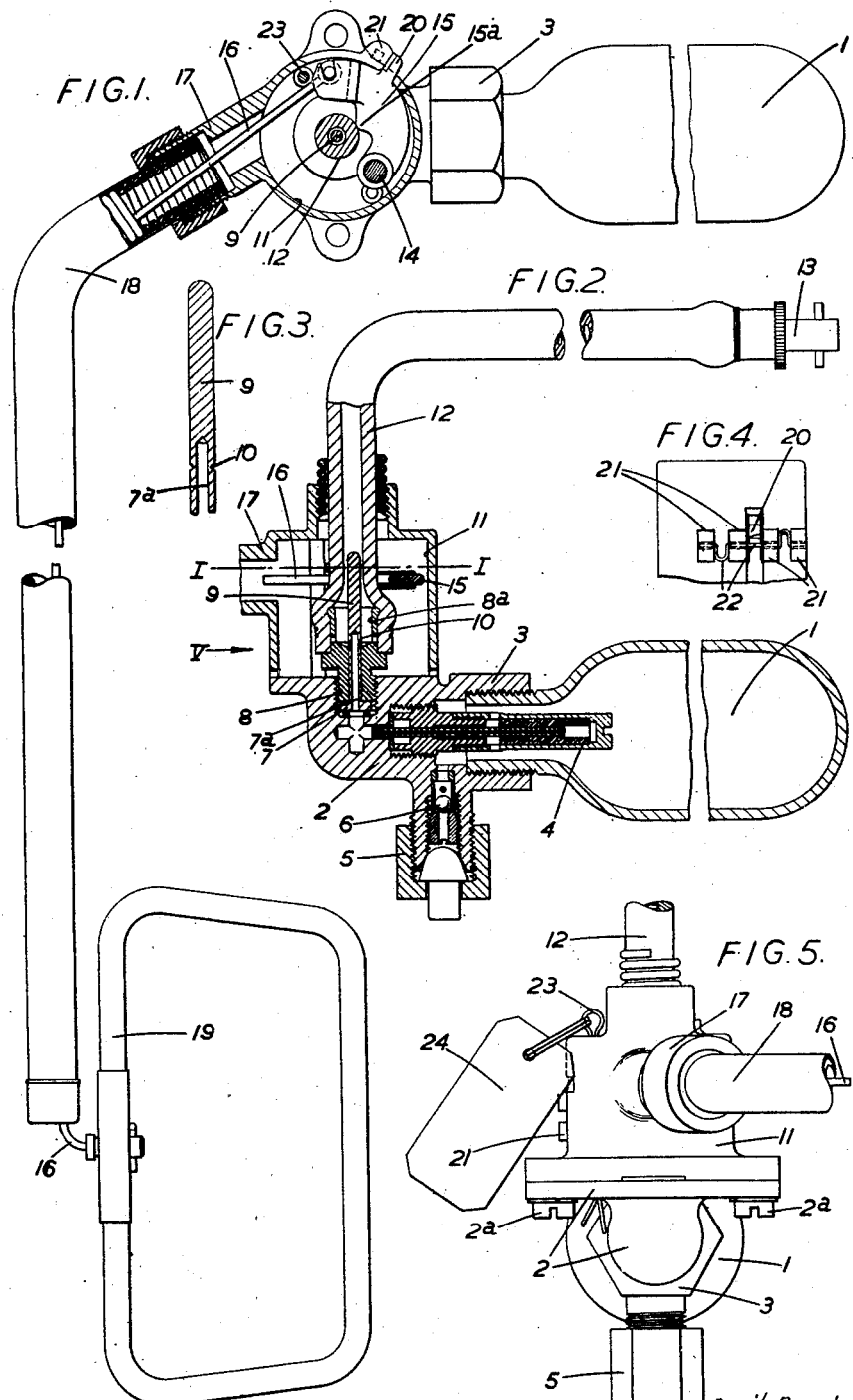
Inventors.
Cecil Burnham Wilson.
Adam Watson White.
By
Harry B Demaser
Attorney Patented Feb. 26, 1946

2,395,439

UNITED STATES PATENT OFFICE 2,395,439

FLUID PRESSURE DELIVERY MECHANISM

Cecil Burnham Wilson, London, and Adam Watson White, Ruislip, England, assignors to Hoover Limited, Perivale, Greenford, England, a company of Great Britain Application January 29, 1943, Serial No. 474,010
In Great Britain July 24, 1942

13 Claims. (Cl. 222—5)

This invention relates to mechanism for controlling the delivery of fluids under pressure and in particular to means for delivering a supply of oxygen or other fluid from a closed container.

A fluid delivery device or release valve is required for many purposes such, for example, for the supply of oxygen to the members of air crews or for the release when required of fluid for fire-extinguishing purposes, and in both such cases the mechanism by which the valve is released or the seal on the container is broken should be capable of operation from a remote point. Further, in the case of a device for delivering oxygen to an airman, it is essential that whilst requiring very little effort, the release mechanism should be of robust construction and proof against unintentional operation. The object of the present invention is to provide such a mechanism particularly but not exclusively suitable for use in connection with the so-called "bail-out" equipment for air pilots.

According to this invention mechanism for delivering fluid under pressure from a closed container, such as an oxygen bottle, comprises a fitting which includes a jet provided with an elongated cap or rod normally sealing the jet and forming an integral extension thereof, together with a device adapted to engage the rod and to cause its fracture at a point near the delivery end of the jet where the wall of the latter is reduced in diameter or otherwise intentionally weakened.

The jet and the fracturing device are mounted within a chamber which also carries the delivery tube for the fluid, and when a flexible tube is used, the sealing rod is enclosed within the lower end of the flexible tube which has a larger bore than the diameter of the rod. As the tube is flexible, it can be deformed by the fracturing device when it is operated to break the seal, and after the rod has been fractured the fluid can still pass through the delivery tube owing to the difference in diameter between the rod and the bore of the tube but the enclosure of the sealing rod within the bore of the flexible tube is not an essential, although a preferred, feature of the invention.

The fracturing device conveniently comprises a pivoted cam so mounted in the chamber adjacent to the free end of the sealing rod that it can be turned about its pivot in a plane at right angles to the length of the rod so as to bring about the fracture of the jet when quite a small force is exerted. The cam is operated by means of a flexible cord which is led into the chamber through a rigid tubular guide and the cord itself is enclosed within an armoured protecting tube, the free end of which carries an operating handle.

The cam preferably has a radial projection extending through an opening in the wall of the chamber and adapted to shear an externally visible indicating wire when the cam is actuated and to do so before the cam engages the flexible tube or sealing rod.

One form of the invention for use in connection with a parachute equipment employed in aircraft is shown by way of example in the accompanying drawing, in which Figure 1 is a plan showing the fracturing device in section on the line 1—1 of Figure 2, Figure 2 is a side elevation, for the most part in vertical section, Figure 3 shows on an enlarged scale the upper end of the nozzle and its sealing rod, Figure 4 shows in elevation the slotted wall of the chamber carrying the indicating wire, and Figure 5 is an elevation seen in the direction of the arrow V of Figure 2.

The oxygen bottle 1 is mounted in a horizontal position on the equipment which is connected to the harness of the pilot (not shown). The fitting comprises a casting 2 having an internally screw-threaded branch 3 adapted to engage the neck of the bottle within which is mounted the usual anti-freezing tube 4. At right angles to the branch 3 is a union 5 containing a non-return valve 6 enabling the bottle to be recharged without removing the fitting. At right angles to the longer axis of the oxygen bottle 1 is a passage containing the discharge jet 7. This jet is mounted in a detachable nipple 8 and comprises a metal stem, the lower portion of which is bored at 7a to form the jet whilst the upper end constitutes a sealing cap or rod 9 of approximately the same length as the portion which is bored. Near the upper or delivery end of the bored portion 7a the wall of the jet is grooved or of reduced diameter, as shown at 10 in Figure 3, so that at this point the rod 9 can be fractured with comparatively little effort. The whole jet is enclosed within a chamber 11 in the form of a cylindrical cover detachably mounted on the fitting 2.

The upper portion of the nipple in which the jet 7 is mounted is provided with a sleeve or skirt 8a which forms an annular guard surrounding the weakened or grooved portion 10 of the jet and this sleeve 8a further serves to receive the end of a flexible delivery tube 12 having a bore of larger diameter than that of the rod 9, the upper portion of which extends into the bore of the tube. The delivery tube 12 passes through the upper wall of the chamber 11 and can be of any convenient length. The tube may be armoured, if desired, and at its free end is furnished with a known device, diagrammatically indicated at 13, for delivering oxygen to the pilot.

Pivotally mounted at 14 on the inner surface of the cover 11 so as to lie in a plane at right angles to the length of the rod 9, is a device for deflecting this rod when the seal is to be broken. This device comprises an approximately crescent-shaped cam 15 partially surrounding the upper end of the rod 9 and its enclosing tube 12 and having its free end connected to one end of a flexible operating cord 16 which passes through a tubular guide 17 formed in the side wall of the casing 11. The cord 16 is led through an armoured flexible hose 18 to a point within the pilot's reach where the opposite end of the cord 16 is secured to a suitable operating handle 19.

The cam 15 has a central projection 15a which bears against the flexible tube 12 and is so arranged that when the cord 16 is pulled, first the flexible tube 12 is deformed and then the rod 9 within it is so deflected that the jet is fractured at the point 10 where it is weakened or grooved. As a result oxygen is free to pass through the anti-freezing tube 4 from the bottle 1 into the jet 7 and thence through the bore of the flexible tube 12 to the delivery end 13 and then to the pilot through the delivery outlet 13.

The outer edge of the cam 15 is provided with a radial projection 20 which passes through a slot formed in the circumferential wall of the casing 11. On each side of the slot are lugs 21 between which the radial projection 20 passes when the cam is rocked about its pivot and an indicating wire 22 is connected to these lugs so that its central portion normally bridges the slot. The radial projection is provided with a knife edge and this is so placed that when the cam is rocked the arm severs the wire before the projecting portion 15a of the cam deflects the sealing rod 9, the wire thus serving to indicate whether or not the seal of the jet is broken. In addition a safety pin 23 having a tag 24 is provided which locks the cam against movement so long as it is in position.

The cylindrical cover constituting the chamber 11 can be detached from the main portion of the fitting 2 by removing screws 2a. This enables the nipple 8 to be removed so that the severed jet can be replaced before the bottle is again charged after the seal has been broken.

It will be seen that although the wall of the jet is grooved or weakened so that it can be readily fractured, the weakened portion is well protected against accidental damage by being enclosed within the annular guard 8a and by the entire fracturing mechanism being mounted within a rigid casing 11. Further, the weakened portion 10 in the wall of the jet is only just above the end of the bore of the nipple 8 in which it is supported and is at an appreciable distance from the plane in which the fracturing cam 15 is situated. Thus a relatively small force only is necessary to deflect the rod 9 and to bring about its fracture at a point which is normally well protected against accidental breakage.

What we claim as our invention and desire to secure by Letters Patent is:

1. Mechanism for delivering fluid under pressure from a closed container including a jet formed integral with a sealing rod, the wall of the jet being weakened near the junction between the rod and the bore of the jet, an annular guard surrounding the weakened portion of the jet, a delivery tube surrounding and being secured to said annular guard and a casing surrounding said delivery tube and guard.

2. Mechanism for delivering fluid under pressure from a closed container as claimed in claim 1 in which the annular guard is formed integral with a nipple in which the jet is mounted.

3. Mechanism for delivering fluid under pressure from a closed container as claimed in claim 1 in which the end of said delivery tube is anchored to the annular guard and surrounds the delivery end of the jet and sealing rod, the bore of the tube being of larger diameter than that of the rod.

4. Mechanism for delivering fluid under pressure from a closed container including a jet comprising an elongated rod normally sealing the jet and forming an integral extension thereof, the wall of said jet being intentionally weakened near its delivery end, a chamber enclosing the jet, a cam pivotally mounted in the chamber adjacent to the free end of the sealing rod so that it can be turned about its pivot to deflect the rod and thus effect a fracture near the other end of the rod where the wall of the jet is weakened.

5. Mechanism for delivering fluid under pressure from a closed container as claimed in claim 4 in which the cam is approximately crescent-shaped and adapted to turn about its pivot in a plane at right angles to the length of the sealing rod.

6. Mechanism for delivering fluid under pressure from a closed container as claimed in claim 4 in which the cam is actuated by means of a flexible cord led into the chamber through a rigid tubular guide on the latter.

7. Mechanism for delivering fluid under pressure from a closed container as claimed in claim 4 in which the chamber has an opening in its wall, an extension on the cam extending through said opening and an externally visible wire adapted to be sheared by the projection when the cam is actuated and before it deflects the sealing rod.

8. Mechanism for delivering fluid under pressure from a closed container as claimed in claim 4 in which the rod and upper end of the jet are enclosed within a flexible tube having a bore of larger diameter than the rod, said tube being deformed by the fracturing cam before the latter deflects the rod to break the seal.

9. Mechanism for delivering a supply of oxygen under pressure from a container, comprising a fitting adapted to be connected to the container and including a chamber, a jet having an integral elongated sealing rod mounted within the chamber, a flexible tube enclosing the jet and leading to the delivery point, a cam pivotally mounted within the chamber and partially surrounding the tube and the upper end of the rod which it encloses, a flexible cord by which the cam can be turned about its pivot to deform the tube and then deflect the sealing rod it surrounds, thus effecting a fracture near the other end of the rod where the wall of the tube is intentionally weakened, a guide for the cord extending laterally from the casing and an armoured tube through which the cord extends to the operating point.

10. Mechanism for delivering a supply of oxygen under pressure from a container as claimed in claim 9 in which the fracturing cam has an extension projecting through a wall in the chamber and an externally visible wire which is sheared by the extension when the cam is operated before the cam deflects the sealing rod.

11. A device for delivering fluid under pressure from a container comprising, a jet formed integrally with a sealing rod, the wall of said jet being weakened near the junction of said jet and rod, an annular guard surrounding the weakened portion of said jet, said rod extending beyond the end of said guard and a delivery tube surrounding and being secured to said guard, the arrangement being such that said rod extends into said tube beyond the end of said guard.

12. A device for delivering fluid under pressure from a container comprising, a jet formed integrally with a sealing rod, the wall of said jet being weakened near the junction of said jet and rod, an annular guard surrounding the weakened portion of said jet, a delivery tube surrounding and being secured to said guard, the arrangement being such that said rod extends into said tube beyond the end of said guard, and movable means positioned to contact said delivery tube beyond the end of said guard and force it into contact with said rod to rupture the weakened portion of said jet.

13. Mechanism for delivering fluid under pressure from a closed container including a jet, comprising an elongated rod normally constituting a seal for said jet and forming an integral extension thereof, the wall of said jet being weakened near its delivery end, manually operable movable means for deflecting said rod to rupture said weakened wall, said manually operable means being normally freely movable before contact with said rod, and rigid removable means in the path of movement of said manually operable means to prevent unintentional movement thereof in a direction to rupture said rod, a flexible delivery tube having a larger bore than the diameter of said rod, enclosing said rod and positioned to be deformed by the fracturing device when the seal is to be broken.

CECIL BURNHAM WILSON.
ADAM WATSON WHITE.